US009413792B2

(12) United States Patent
Menezes et al.

(10) Patent No.: US 9,413,792 B2
(45) Date of Patent: Aug. 9, 2016

(54) DETECTING QUALITY OF SERVICE FOR UNIFIED COMMUNICATION AND COLLABORATION (UC AND C) ON INTERNETWORKS

(71) Applicant: Microsoft Corporation, Redmond, WA (US)

(72) Inventors: Pascal Menezes, Bellevue, WA (US); Wajih Yahyaoui, Bellevue, WA (US); Warren Barkley, Preston, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 800 days.

(21) Appl. No.: 13/672,933

(22) Filed: Nov. 9, 2012

(65) Prior Publication Data

US 2014/0136718 A1      May 15, 2014

(51) Int. Cl.
*H04L 29/06* (2006.01)
*H04L 12/851* (2013.01)
*H04L 12/891* (2013.01)
*H04L 12/803* (2013.01)

(52) U.S. Cl.
CPC ........ *H04L 65/1083* (2013.01); *H04L 47/2408* (2013.01); *H04L 47/2441* (2013.01); *H04L 47/125* (2013.01); *H04L 47/41* (2013.01)

(58) Field of Classification Search
CPC ..... H04L 1/0002; H04L 1/20; H04L 12/1822; H04L 41/12; H04L 41/5003; H04L 41/509; H04L 43/0817; H04L 29/06027; H04L 47/125; H04L 47/2408; H04L 65/1006; H04L 65/1046; H04L 65/80; H04L 67/16; H04L 67/32; H04L 2212/00; H04L 45/22; H04L 45/302; H04L 45/50; H04L 47/2433; H04L 65/1013; H04L 65/1083; H04L 65/608; H04L 63/0272; H04L 12/4641; H04L 63/1408; H04L 41/0896; H04W 28/0205
See application file for complete search history.

(56) References Cited

U.S. PATENT DOCUMENTS

| 5,995,503 | A | * | 11/1999 | Crawley | .................. | H04L 45/08 370/351 |
| 6,493,317 | B1 | | 12/2002 | Ma | | |
| 7,852,784 | B2 | | 12/2010 | Leung et al. | | |

(Continued)

FOREIGN PATENT DOCUMENTS

WO        2006/086553 A2        8/2006

OTHER PUBLICATIONS

"International Search Report & Written Opinion for PCT Patent Application No. PCT/US2013/069359", Mailed Date: Mar. 18, 2014, Filed Date: Nov. 9, 2013, 12 Pages.

(Continued)

*Primary Examiner* — Kevin Bates
*Assistant Examiner* — Ranjan Pant
(74) *Attorney, Agent, or Firm* — Andrew Smith; Harri Valio; Micky Minhas

(57) ABSTRACT

QoS support is detected during discovery of potential media paths between a source and a destination by examining the markings of each available media path and selecting a more suitable media candidate based on a set of QoS prioritization rules. Optionally, each endpoint may update a UC&C monitoring service with the QoS results of the candidate list discovery process so that any automated diagnostic and auditing systems can be alerted to any misconfigured Network Elements.

20 Claims, 7 Drawing Sheets

(56) References Cited

U.S. PATENT DOCUMENTS

| | | | | |
|---|---|---|---|---|
| 8,249,057 | B1* | 8/2012 | Mohaban | H04L 29/06027 370/352 |
| 2004/0223497 | A1* | 11/2004 | Sanderson | H04L 12/4641 370/395.52 |
| 2007/0078986 | A1* | 4/2007 | Ethier | H04L 65/1069 709/227 |
| 2008/0049637 | A1* | 2/2008 | Morrill | H04L 65/80 370/252 |
| 2008/0148379 | A1* | 6/2008 | Xu | H04L 29/125 726/11 |
| 2009/0327479 | A1* | 12/2009 | Zavalkovsky | H04L 67/02 709/224 |
| 2011/0145397 | A1* | 6/2011 | Burns | H04L 29/1249 709/224 |
| 2012/0144013 | A1* | 6/2012 | Eckert | H04L 65/1046 709/224 |
| 2013/0205002 | A1* | 8/2013 | Wang | H04L 69/16 709/224 |
| 2014/0039901 | A1* | 2/2014 | Mosko | H04M 11/066 704/500 |
| 2015/0117198 | A1* | 4/2015 | Menezes | H04L 47/20 370/235 |

OTHER PUBLICATIONS

Perez, et al., "A Network and Data Link Layer Infrastructure Design to Improve QoS for Real Time Collaborative Systems", In International Conference on Internet and Web Applications and Services/Advanced International Conference on Telecommunications, Feb. 19, 2006, 6 Pages.

Puschita, et al., "An Innovative QoS Paradigm Based on Cognitive In-network Management of Resources for a Future Unified Network Architecture: I-Name QoS Model", In Second International Conference on Advances in Future Internet, Jul. 18, 2010, pp. 37-43.

Onuiri, et al., "Quality of Service in Unified Communication", Retrieved at <<http://www.ijarcsse.com/docs/papers/May2012/Volum2__issue5/V2I500314.pdf>>, In the International Journal of Advanced Research in Computer Science and Software Engineering, May 2005, pp. 9.

Lu, et al., "A Novel QoS Framework and Routing Scheme", Retrieved at <<http://ieeexplore.ieee.org/stamp/stamp.jsp?tp=&arnumber=5471429>>, Proceedings of the International Conference on Communications and Mobile Computing, vol. 01, Apr. 12, 2010, pp. 5.

"The New Network for Collaboration—Optimizing UC&C Deployment with Microsoft Lync and Polycom", Retrieved at <<http://www.juniper.net/us/en/local/pdf/solutionbriefs/3510449-en.pdf>>, Retrieved Date: Aug. 30, 2012, pp. 5.

"Benefits of Deploying Unified Communications on a Cisco Integrated Network", Retrieved at <<http://www.cisco.com/en/US/prod/collateral/voicesw/ps6882/ps6884/solution_overview_c22-484573.pdf>>, Retrieved Date: Aug. 30, 2012, pp. 15.

"Voice over IP Yields Unexpected Benefits", Retrieved at <<http://www.cisco.com/web/about/ciscoitatwork/downloads/ciscoitatwork/pdf/Trends_in_IT_UC_Collaboration_Benefits.pdf>>, Retrieved Date: Aug. 30, 2012, pp. 6.

"Enterprise Unified Communications and Collaboration Services: Audio, Video and Net Conferencing", Retrieved at <<http://mn.gov/oet/images/EUCC%2520Audio-Video-Net%2520Service%2520Description%2520v%25201%252E0.pdf>>, Retrieved Date: Aug. 30, 2012, pp. 7.

"Unified Communications Services", Retrieved at <<http://www8.hp.com/us/en/business-services/it-services.html?compURI=1078996#.UD8vi6B1y_l>>, Retrieved Date: Aug. 30, 2012, pp. 6.

"Alcatel-Lucent Enterprise IP communications: IPv6 transition plans", Retrieved at <<http://support.voiceaccess.nl/attachments/token/tz5ppwbn8xe0hac/?name=IPv6_ApplicationNote_EN.pdf>>, Retrieved Date: Aug. 30, 2012, pp. 15.

* cited by examiner

DETECTING QUALITY OF SERVICE FOR UNIFIED COMMUNICATION AND COLLABORATION (UC AND C) ON INTERNETWORKS

BACKGROUND

Modern communication systems have a large number of capabilities including integration of various communication modalities with different services. For example, instant messaging, voice/video communications, data/application sharing, white-boarding, and other forms of communication may be combined with presence and availability information of subscribers. Such systems may provide subscribers with the enhanced capabilities such as providing instructions to callers for various status categories, alternate contacts, calendar information, and comparable features. Furthermore, collaboration systems enabling users to share and collaborate in creating and modifying various types of documents and content may be integrated with multimodal communication systems providing different kinds of communication and collaboration capabilities. Such integrated systems are sometimes referred to as Unified Communication and Collaboration (UC&C) systems.

UC&C enables people to interact, communicate and collaborate using a rich set of mediums including voice and video. However for UC&C to operate correctly networks play a substantial role in providing an acceptable experience for both voice and video which have large dependencies on bounded network performance metrics such as delay, jitter and packet loss. To facilitate these requirements, network operators need to enable end-to-end Quality of Service (QoS) especially on slower links such as Wi-Fi and Wide Area Networks (WANs). When networks are not enabled for proper QoS, users may experience unacceptable performance degradations such as loss of audio, video artifacts, distortions and/or freezing. All of this may lead to end-user frustration and declining confidence in which productivity may suffer.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to detecting QoS support during discovery of potential media paths between a source and a destination by examining the markings of each available media path and selecting a more suitable media candidate based on a set of QoS prioritization rules. For example, QoS detection may be performed during Interactive Connectivity Establishment. Each endpoint may additionally update a UC&C monitoring service with the QoS results of the candidate list discovery process so that any automated diagnostic and auditing systems can be alerted to any misconfigured Network Elements by performing trace route functions for the NEs along a given path.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
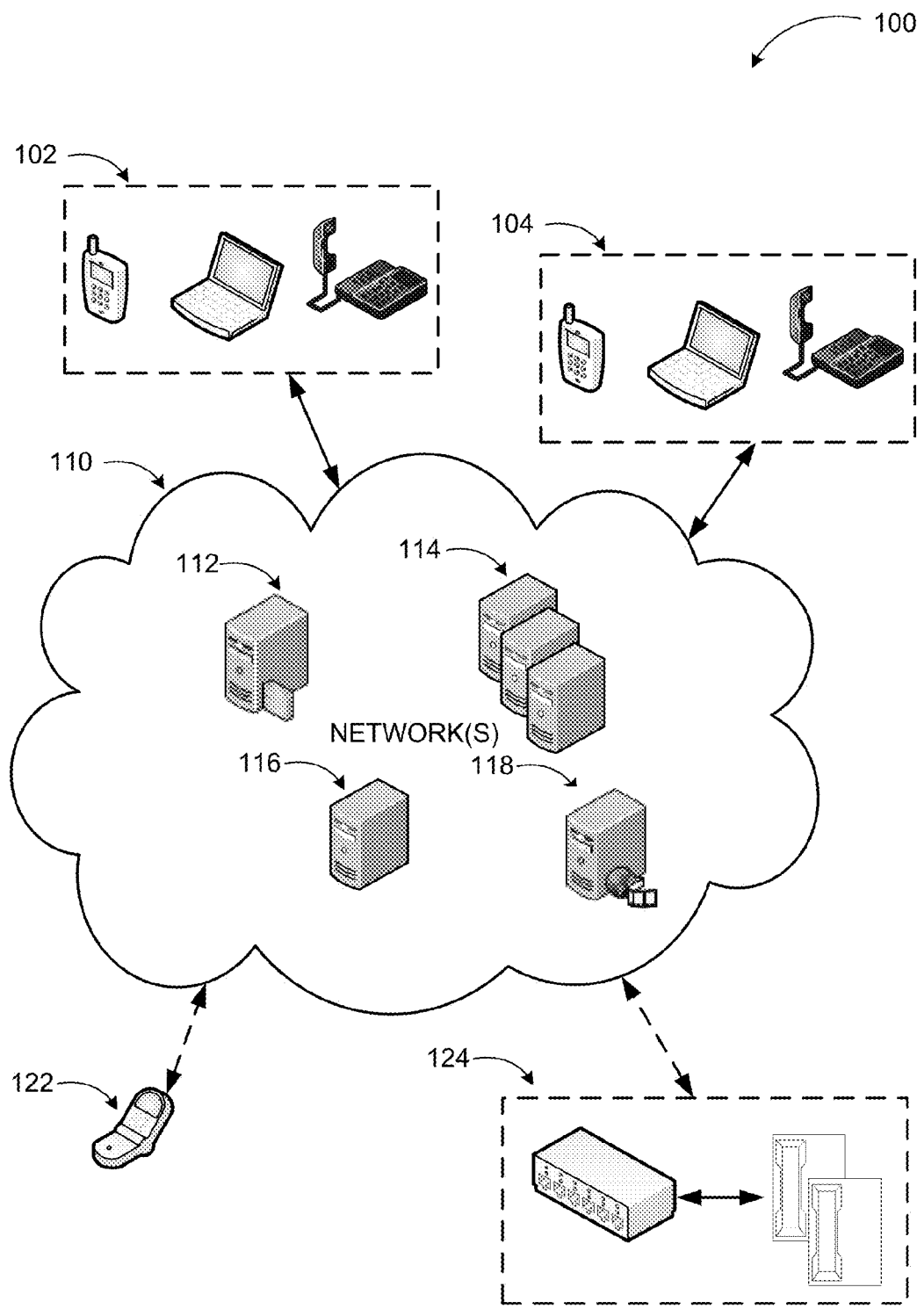
FIG. 1 is a diagram illustrating an example UC&C system, where embodiments may be implemented for UC aware networks.

As briefly described above, QoS of a UC&C network may be determined during discovery of media paths and used as a selection criterion in choosing a path for a conversation session with one or more modalities.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, and a flash drive.

Throughout this specification, the term "platform" may be a combination of software and hardware components for providing multimodal communication services such as audio calls, video conferences, and/or data exchange. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example embodiments may be found in the following description.

FIG. 1 is a diagram illustrating an example UC&C system, where embodiments may be implemented for UC aware networks. A unified communication system is an example of modern communication systems with a wide range of capabilities and services that can be provided to subscribers. A unified communication system is a real-time communications system facilitating instant messaging, presence, audio-video conferencing, web conferencing functionality, and comparable capabilities. Modern unified communication systems are complemented with collaboration capabilities enabling users to share, create, modify, and perform other collaborative tasks on various types of documents and exchange documents in different communication sessions. Such systems may also be referred to as Unified Communication & Collaboration (UC&C) systems.

In a UC&C system such as the one shown in diagram 100, users may communicate via a variety of end devices (102, 104), which are client devices of the UC&C system. Each client device may be capable of executing one or more communication applications for voice communication, video communication, instant messaging, application sharing, data sharing, and the like. In addition to their advanced functionality, the end devices may also facilitate traditional phone calls through an external connection such as through PBX 124 to a Public Switched Telephone Network ("PSTN"). The end devices may also enable users to manage documents of different types such as word processing documents, spreadsheet documents, presentation documents, and comparable ones. End devices may include any type of smart phone, cellular phone, any computing device executing a communication application, a smart automobile console, and advanced phone devices with additional functionality.

UC&C Network(s) 110 includes a number of servers performing different tasks. For example, UC&C servers 114 provide registration, presence, and routing functionalities. Routing functionality enables the system to route calls to a user to anyone of the client devices assigned to the user based on default and/or user set policies. For example, if the user is not available through a regular phone, the call may be forwarded to the user's cellular phone, and if that is not answering a number of voicemail options may be utilized. Since the end devices can handle additional communication modes, UC&C servers 114 may provide access to these additional communication modes (e.g. instant messaging, video communication, etc.) through access server 112. Access server 112 resides in a perimeter network and enables connectivity through UC&C network(s) 110 with other users in one of the additional communication modes. UC&C servers 114 may include servers that perform combinations of the above described functionalities or specialized servers that only provide a particular functionality. For example, home servers providing presence functionality, routing servers providing routing functionality, rights management servers, and so on. Some of the UC&C servers 114 may provide hosted applications for collaboration on documents such as spreadsheet, word processing, presentation, graphic processing, and so on. Similarly, access server 112 may provide multiple functionalities such as firewall protection and connectivity, or only specific functionalities.

Audio/Video (A/V) conferencing server 118 may provide audio and/or video conferencing capabilities by facilitating those over an internal or external network. Mediation server 116 may mediate signaling and media to and from other types of networks such as a PSTN or a cellular network (e.g. calls through PBX 124 or from cellular phone 122). Mediation server 116 may also act as a Session Initiation Protocol (SIP) user agent.

In a UC&C system, users may have one or more identities, which is not necessarily limited to a phone number. The identity may take any form depending on the integrated networks, such as a telephone number, a Session Initiation Protocol (SIP) Uniform Resource Identifier (URI), or any other identifier. While any protocol may be used in a UC system, SIP may be a commonly employed method. SIP is an application-layer control (signaling) protocol for creating, modifying, and terminating sessions with one or more participants. It can be used to create two-party, multiparty, or multicast sessions that include Internet telephone calls, multimedia distribution, and multimedia conferences. SIP is designed to be independent of the underlying transport layer.

SIP clients may use Transport Control Protocol ("TCP") to connect to SIP servers and other SIP endpoints. SIP is primarily used in setting up and tearing down voice or video calls. However, it can be used in any application where session initiation is a requirement. These include event subscription and notification, terminal mobility, and so on. Voice and/or video communications are typically done over separate session protocols, typically Real time Transport Protocol ("RTP").

As an example some UC&C systems may use Secure Real Time Transport Protocol (SRTP) as the transport for voice and video media. Additionally, SRTP uses dynamic ports which are negotiated between two UC&C endpoints within the payload of an encrypted signaling protocol like SIP. QoS for a communication session may be determined during discovery of potential media paths between a source and a destination by examining the markings of each available media path and a media candidate may be selected based on a new set of QoS prioritization rules. While conventional systems select media paths based on port prioritization and NAT traversal connectivity (e.g., Interactive Connectivity Establishment "ICE"), a system according to embodiments may take QoS into account. Each endpoint may additionally update a UC&C monitoring service with the QoS results of the candidate list discovery process so that any automated diagnostic and auditing systems can be alerted to any misconfigured Network Elements "NEs" by performing trace route functions for the NEs along a given path.

While the example system in FIG. 1 has been described with specific components such as mediation server, A/V server, and similar devices, embodiments are not limited to this system of the example components and configurations. A service for managing multimodal communications with UC aware networks may be implemented in other systems and configurations employing fewer or additional components.

Figure 2:
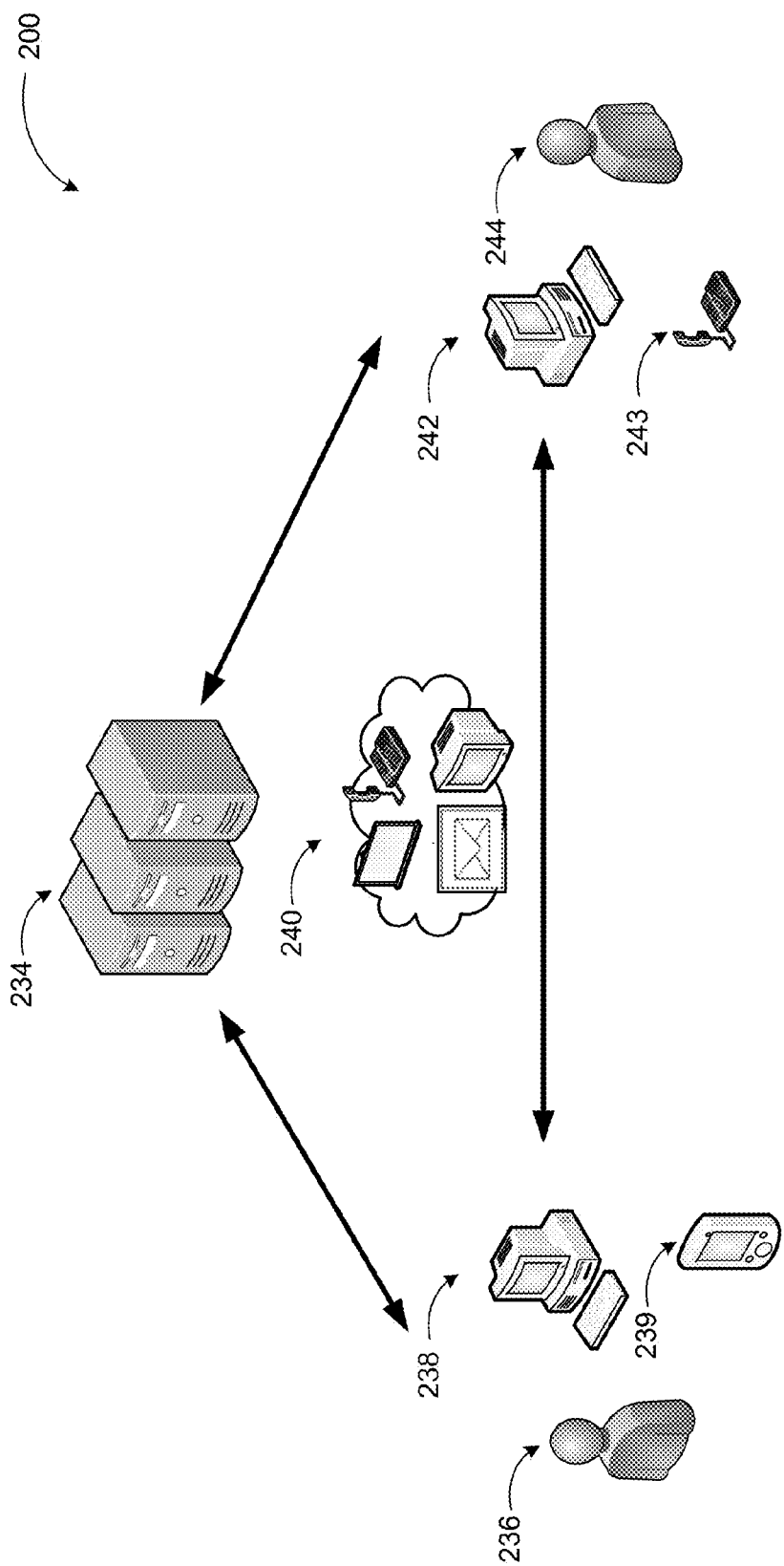
FIG. 2 is a conceptual diagram illustrating a basic example system for providing multimodal communications with collaboration.

FIG. 2 is a conceptual diagram illustrating a basic example system for providing multimodal communications with collaboration. While a system according to embodiments is likely to include a number of servers, client devices, and services such as those illustratively discussed in FIG. 1, only those relevant to embodiments are shown in FIG. 2.

As mentioned previously, communication between two or more users in an enhanced communication system such as a UC&C system may be facilitated through multiple devices with varying communication mode capabilities. In a UC&C system employing SIP for communication between endpoints, a caller may initiate a communication session by sending an INVITE to the called party. The called party may potentially accept the INVITE from a number of different devices or endpoints. However, not all these devices may be able to handle all forms or modalities of communication. In a system according to embodiments, the INVITE may be sent to devices capable of handling the requested mode of communication.

One of the notable aspects of a multi-modal communication system is QoS, which impacts user experience substantially. Today's technologies for QoS use standards such as Wi-Fi 802.11e, Ethernet IEEE 802.1p, IP IETF Diff Serv, etc., where endpoints or access NEs classify and mark traffic into Classes of Services (CoS), which in turn allow each downstream NE to further prioritize traffic. As the marked frame/packet transverses the network, traffic may be scheduled onto outbound trunks using various queuing algorithms such as Weighted Fair Queuing (WFQ), Weighted Round Robin (WRR), etc. for each outbound queue, hop-by-hop, until the final destination is reached.

The basic components of a system according to embodiments include client devices 238 and 239 executing communication applications for user 236, client devices 242 and 243 executing different versions of the same or a different communication application for user 244, and servers 234. The communication applications for users 236 and 244 facilitate multi-modal communication sessions 240 (over one or more networks) between the users 236 and 244, as well as the users and automated applications on one or more of the servers 234.

Each modality within the conversation may be managed by a different server such as a file server for file exchanges, an A/V server for managing audio/video communications, an email server for managing exchange of emails or instant messages, and so on. Other modalities that may be used video conferencing, white-boarding, file transfer, and comparable ones.

Figure 3:
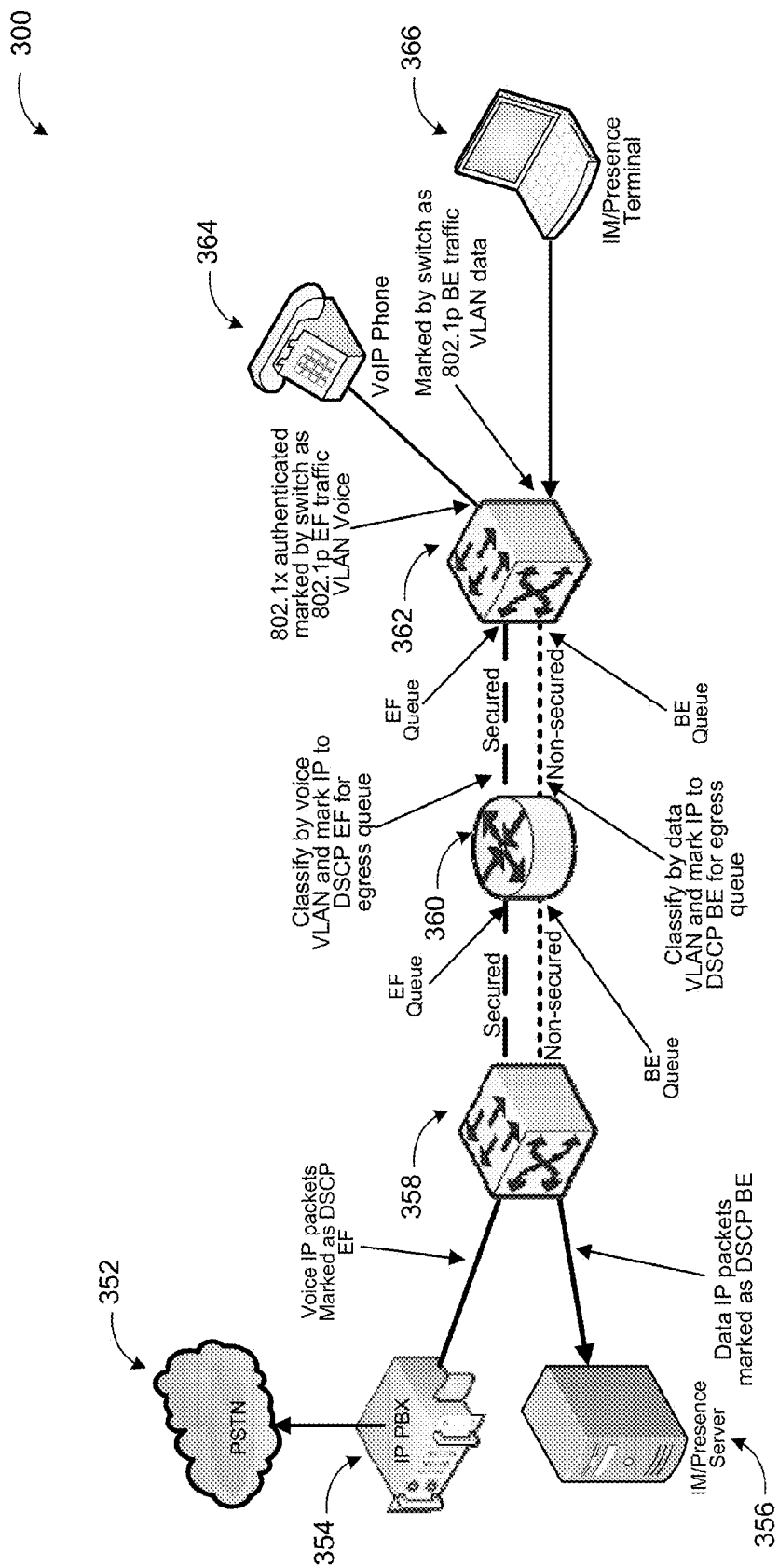
FIG. 3 illustrates management, signaling, and media exchange between major components of a system according to a Voice over IP (VOIP) and data reference model.

FIG. 3 illustrates management, signaling, and media exchange between major components of a system according to a Voice over IP (VOIP) and data reference model in diagram 300.

UC&C systems employ a control plane, in which signaling discovers, sets up, and secures two or more endpoints before media is exchanged. As new dialogs appear in the UC&C network, a UC&C control server may enlighten a network infrastructure policy system as to the creation or deletion of a given dialog with a rich set of dialog attributes called a UC&C dialog information element. This communication may happen in the management plane while the signaling plane is setting up the media plane between one or more UC&C endpoints.

An increasing number of enterprise networks may fail to follow the above-discussed QoS deployment model, where UC&C for voice and video becomes an afterthought. An enterprise network may have started with UC&C using IM and Presence (data only), for example, and voice and video may be deployed on separate networks using Virtual Local Area Networks (VLANs) locked down by security and QoS policies (e.g., 802.1x and remarking all ingress packets to QoS 0 at access points of the network except for voice and video VLANs.) While this model may work very well when voice, video and data use disparate devices, UC&C employs a general purpose PC, smartphones, and/or tablet, and can therefore use a single connection to access all modalities simultaneously over a single IP network fabric.

In the example configuration of diagram 300, secured and non-secured communication lines may be used between switches 358 and 362 of the UC&C network. An IP PBX 354 may receive VOIP packets marked as DSCP EF from switch 358 and facilitate communications with external networks such as PSTN 352. Switch 358 may also forward data IP packets marked as DSCP BE to the IM/presence server 356. Expedited Forwarding (EF) queues may be formed at router 360 and switch 362 on the secured lines, while Best Effort (BE) queues may be formed on the non-secured lines. At the router 360, packets may be classified by voice VLAN and marked IP header for DSCP EF for the egress queue. Other packets may be classified by data VLAN and marked IP header for DSCP BE for the egress queue. Switch 362 may facilitate communications with VOIP phone 364 and IM/presence terminal 366 by receiving packets and marking them for the EF or BE traffic.

Figure 4:
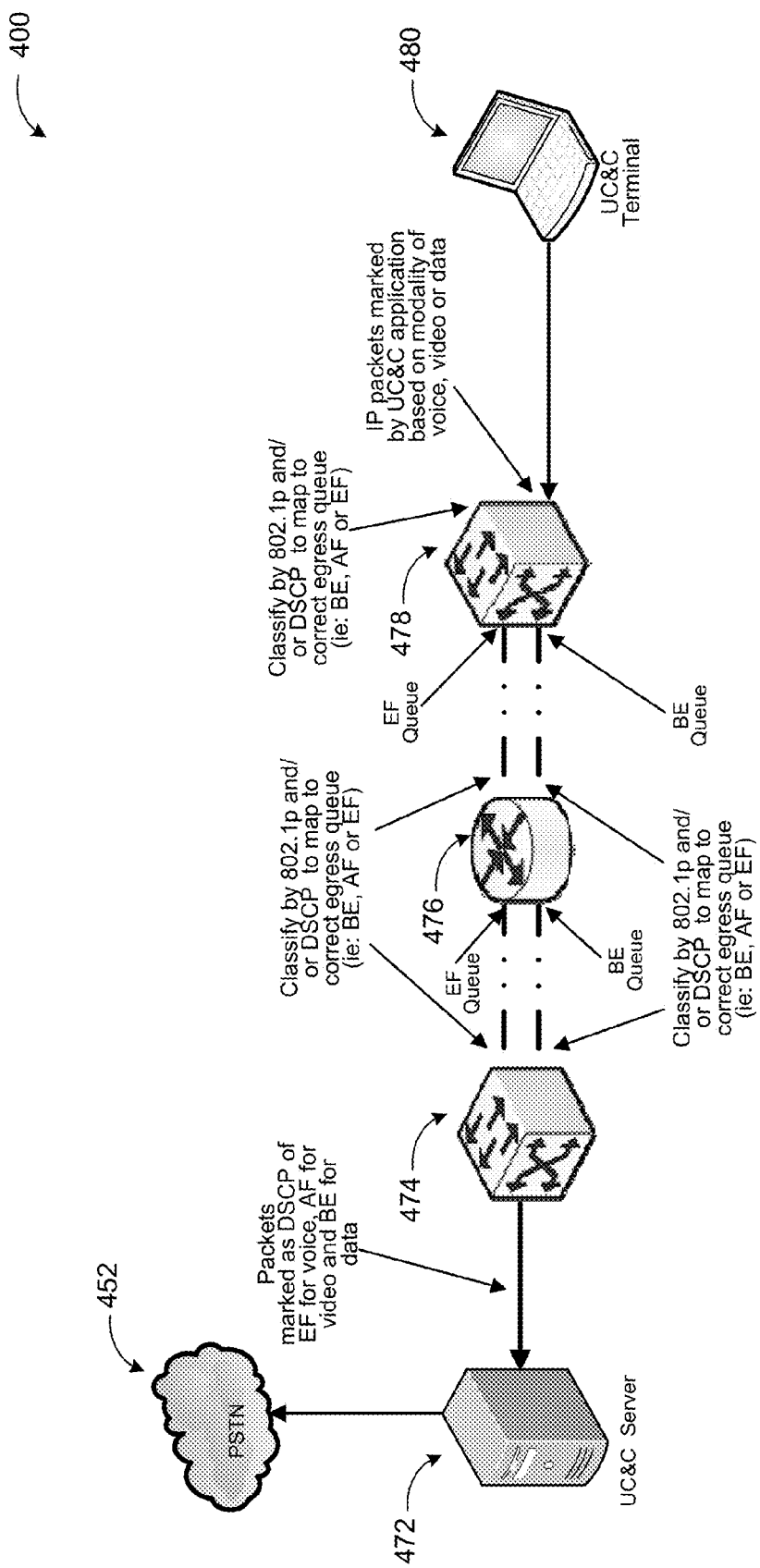
FIG. 4 illustrates major components and interactions in a UC&C deployment model according to some embodiments.

FIG. 4 illustrates major components and interactions in a UC&C deployment model in diagram 400.

Since UC&C systems normally operate on a single converged network infrastructure, a system according to embodiments may select a path between two end-users or a conference bridge such that QoS is propagated end-to-end correctly. In many UC&C systems, a signaling plane discovers, negotiates, and sets up the media plane on which rich multimodal communication and collaboration can occur. It is rather common for a signaling protocol to discover all potential media paths between the source and destination and choose the path based on port prioritization and NAT traversal connectivity (e.g., ICE). During this media path discovery process, QoS may also be determined by examining the markings of each available media path and a media candidate set selected based on a new set of QoS prioritization rules. Each endpoint may additionally update a UC&C monitoring service with the QoS results of the candidate list discovery process so that any automated diagnostic and audit systems can be alerted to any misconfigured NEs by performing trace route functions for all NEs along a given path.

In some situations, a media path may demonstrate that QoS markings are not being propagated end-to-end, for example, when a user is remote and using the Internet to connect back to the UC&C system. A system according to embodiments can accommodate such scenarios by discovering that the UC&C client is remote and connected to the Internet by being directly connected to a private IP address subnet where the second hop NE is on a public IP address space.

At a high level, a system according to embodiments may perform the following example actions: (1) discover all media paths between two UC&C end-points; (2) sort the set of potential media paths by prioritization that also includes QoS as one of the metrics; and (3) optionally update a UC&C monitoring service for all media paths not supporting QoS markings correctly, except for known non-QoS scenarios, by discovery of the misconfigured intermediate nodes using trace route.

As shown in diagram 400, IP packets from a UC&C terminal 480 may be marked by a UC&C application based on the modality such as video, voice, or data and classified by 802.1 and/or DSCP to map them to the correct egress queue (BE, EF, or AF) at the switch 478 or router 476 in both directions (toward the terminal or toward the network). As in the system of diagram 300, switches 474 and 478, and router 476 perform traffic management duties with the UC&C server 472 managing the overall traffic and communications with external networks such as PSTN 452. Packets directed to the UC&C server 472 may be marked as DSCP of EF for voice, AF for video, and BE for data.

QoS may bring up the question of how do NEs, access points (APs), routers, and WAN optimizers know which queue to place the media traffic. This may be accomplished if the endpoints mark the traffic with the correct QoS layer tag by the UC&C application. Conventional systems, where audio, video, and data communications are separately handled, the voice call may be placed on separate virtual networks and authenticated. However, in a system with integration of UC&C to smartphones and soft clients, running voice virtual networks throughout a facility may be very complex, expensive, and inefficient. Thus, a system according to embodiment may dynamically provision a network flow policy for certain NEs that have slow mediums, which are prone to congestion (e.g., Wi-Fi APs, branch WAN optimizers, etc.). Other NEs that have fast links like Gigabit Ethernet (GE) or faster are unlikely to get flash congested if the NEs are capable of full line rate.

The example systems in FIG. 1 through 4 have been described with specific devices, applications, and interactions. Embodiments are not limited to systems according to these example configurations. Quality of service for UC&C on internetworks may be implemented in configurations employing fewer or additional components and performing other tasks. Furthermore, specific protocols and/or interfaces may be implemented in a similar manner using the principles described herein.

Figure 5:
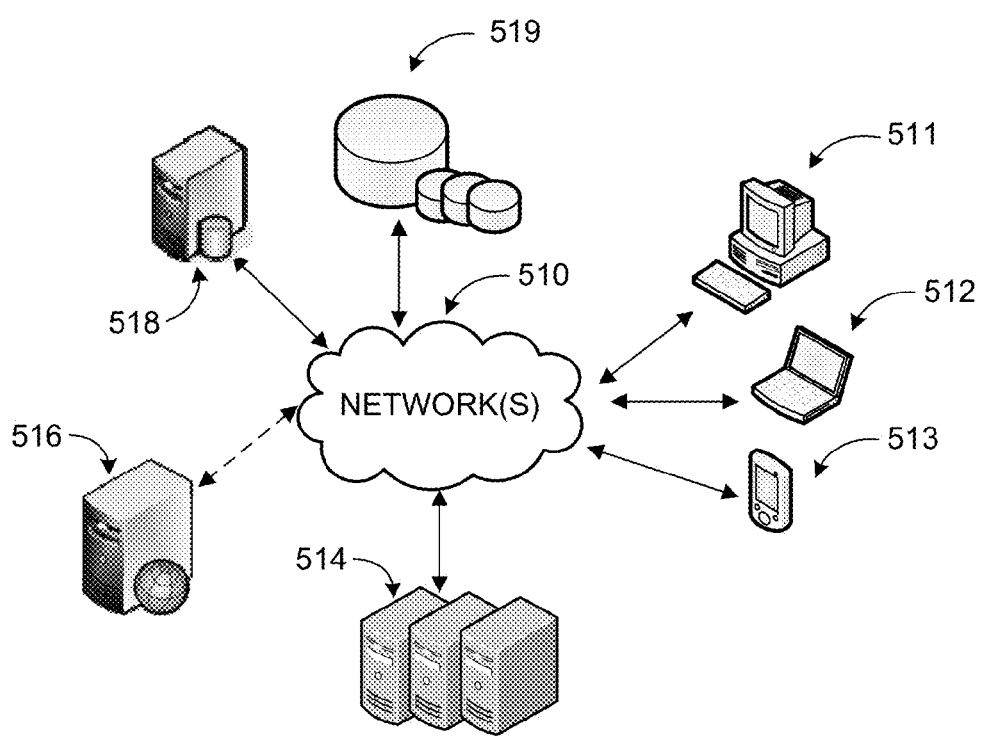
FIG. 5 is a networked environment, where a system according to embodiments may be implemented.

FIG. 5 is an example networked environment, where embodiments may be implemented. A UC-aware system detecting QoS may be implemented via software executed over one or more servers 514 such as a hosted service. The platform may communicate with client applications on individual computing devices such as a smart phone 513, a laptop computer 512, or desktop computer 511 ('client devices') through network(s) 510.

Client applications executed on any of the client devices 511-513 may facilitate communications via application(s) executed by servers 514, or on individual server 516. An application executed on one of the servers may facilitate multi-modal communication sessions with collaboration features. QoS for a communication session may be determined during discovery of potential media paths between a source and a destination by examining the markings of each available media path and a media candidate may be selected based on a new set of QoS prioritization rules. The application may store the request for a communication session in data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to provide a UC-aware network detecting QoS. Furthermore, the networked environments discussed in FIG. 5 are for illustration purposes only. Embodiments are not limited to the example applications, modules, or processes.

Figure 6:
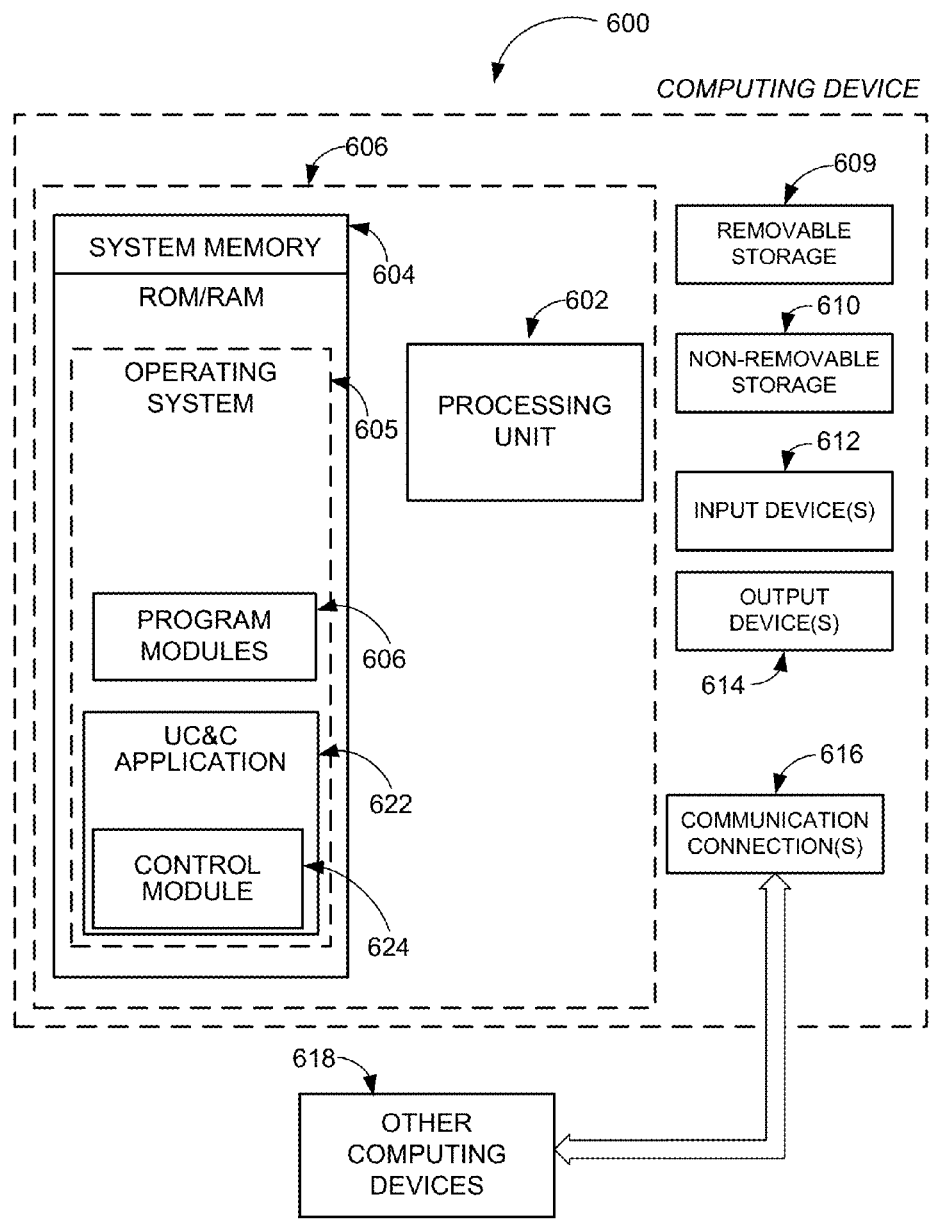
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be any computing device executing a UC&C application according to embodiments and include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606, UC&C application 622, and control module 624.

UC&C application 622 may facilitate multimodal communications and collaboration among subscribers of a UC&C network. In some embodiments, UC&C application 622 in coordination with the control module 624 may determine QoS during discovery of potential media paths between a source and a destination by examining the markings of each available media path and select a media candidate based on a new set of QoS prioritization rules. UC&C application 622 and control module 624 may be separate applications or integrated modules of a hosted service. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wired or wireless network in a distributed computing environment, a satellite link, a cellular link, a short range network, and comparable mechanisms. Other devices 618 may include computer device(s) that execute communication applications, web servers, and comparable devices. Communication connection(s) 616 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
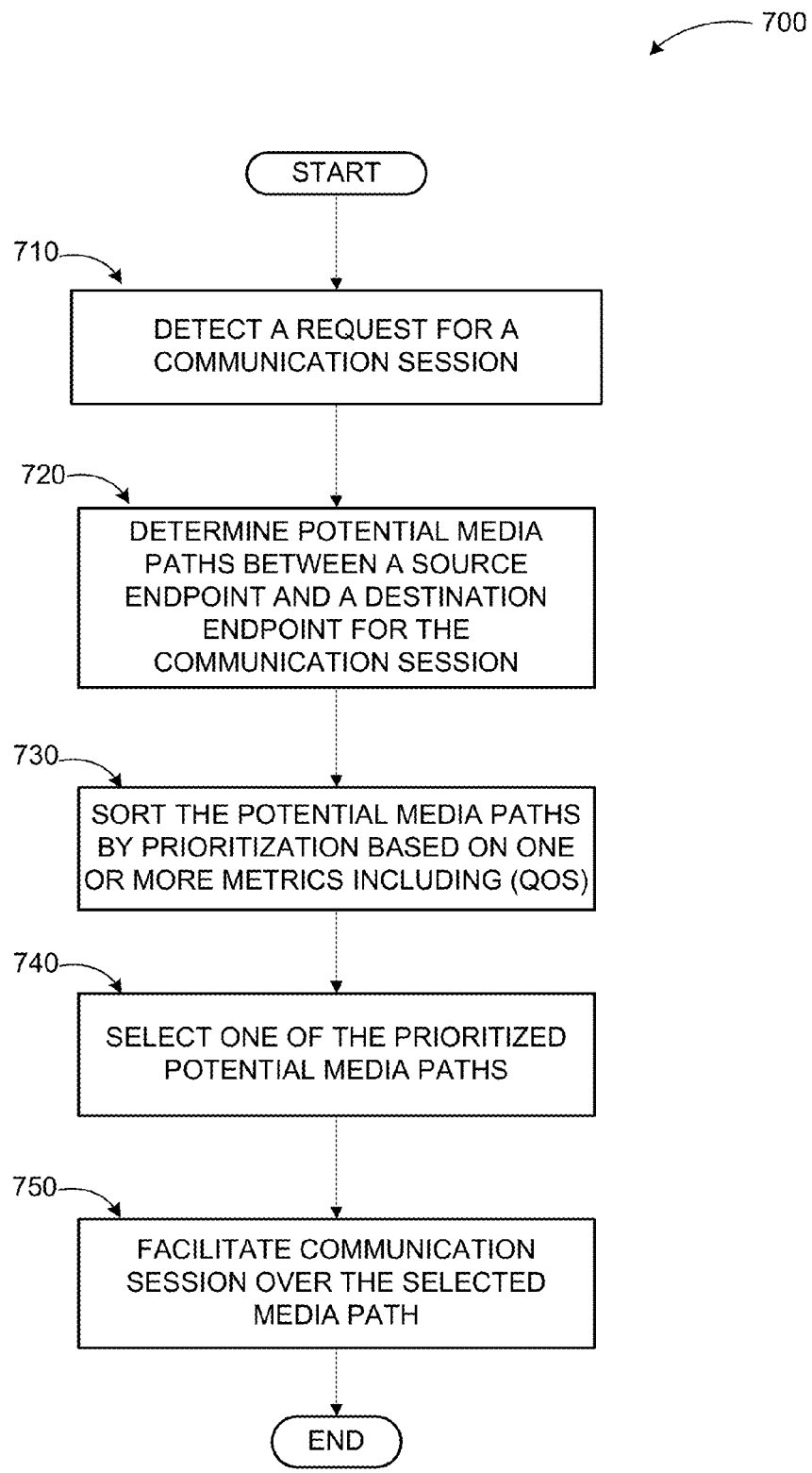
FIG. 7 illustrates a logic flow diagram for a process of detecting QoS during discovery of potential media paths in UC-aware network communications according to embodiments.

FIG. 7 illustrates a logic flow diagram for a process of detecting QoS during discovery of potential media paths in UC-aware network communications according to embodiments. Process 700 may be implemented on a computing device that may manage communication sessions. The communication sessions may include an audio call, an application sharing session, a data sharing session, a whiteboard sharing session, and/or a video conference.

Process 700 begins with operation 710, where a UC&C control server may detect a communication session request from one of the UC&C endpoints. The request may be for any type of modality or a collaboration session. At operation 720, the UC&C control server may determine potential media paths between a source endpoint and a destination endpoint for facilitating the communication session. As part of the discovery process the UC&C control server may determine attributes for the session such as source and destination network addresses, transport type, source and destination ports for the transport, encryption status, media type, and/or codex information. The UC&C control server may also determine whether the potential media paths support QoS.

At operation 730, the potential media paths may be sorted by prioritization based on one or more metrics including QoS. If a potential media path does not support QoS, it may be marked as a last resort path. At operation 740, one of the prioritized potential media paths may be selected based on QoS and/or other metrics such as cost, bandwidth, modality support, etc. At operation 750, the UC&C control server may enable facilitation of the requested communication session over the selected media path. The communication session may be facilitated over the control server or directly through the path by-passing the control server.

The operations included in process 700 are for illustration purposes. QoS detection during media path discovery in a UC-aware communication system may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device for facilitating a communication session in a unified communication and collaboration (UC&C) aware network, the method comprising:
   detecting a request for the communication session;
   during a discovery of potential media paths between a source and a destination for facilitating the communication session, detecting whether each discovered potential media path supports Quality of Service (QoS);
   sorting the potential media paths based on a prioritization of the potential media paths and NAT traversal connectivity, wherein the prioritization of the potential media paths is based on one or more of a Quality of Service (QoS) support, a port configuration, and a bandwidth availability;
   if one or more potential media paths support QoS, prioritizing the potential media paths that support QoS; and
   if a potential media path does not support QoS, designating that media path as a last resort media path.

2. The method of claim 1, further comprising:
   selecting one of the prioritized potential media paths; and
   facilitating the requested communication session over the selected prioritized potential media path.

3. The method of claim 1, further comprising:
   receiving packets for the communication session at a switch, wherein the switch forms expedited forwarding (EF) queues;
   marking, by the switch, the packets for one of EF queues and Best Effort (BF) queues; and
   detecting whether the potential media paths support the QoS by examining the markings of each available media path.

4. The method of claim 1, further comprising:
   detecting whether the potential media paths support the QoS during Interactive Connectivity Establishment (ICE).

5. The method of claim 1, further comprising:
   updating a unified communication and collaboration (UC&C) monitoring service with QoS detection results such that one or more automated diagnostic and auditing systems are alerted to misconfigured Network Elements (NEs).

6. The method of claim 5, further comprising:
   performing one or more trace route functions for NEs along each discovered media path.

7. The method of claim 1, wherein the QoS is based on one or more standards including Wi-Fi IEEE 802.11e, Ethernet IEEE 802.1p, and IP IETF Diff Serv.

8. The method of claim 1, further comprising:
   scheduling communication traffic onto outbound trunks employing one or more of Weighted Fair Queuing (WFQ) and Weighted Round Robin (WRR) at each outbound queue.

9. The method of claim 1, further comprising:
   discovering a remote UC&C client connected to the Internet based on the UC&C client being directly connected to a private IP address subnet where a second hop NE is on a public IP address space.

10. The method of claim 1, further comprising:
prioritizing the potential media paths based on one or more of cost and one or more modalities of the communication session.

11. The method of claim 1, wherein the communication session is at least one from a set of: an audio call, an application sharing session, a data sharing session, a whiteboard sharing session, a video conference, and a collaboration exchange.

12. A computing device acting as a unified communication and collaboration (UC&C) control server for facilitating a communication session in a UC&C aware network, the computing device comprising:
a memory;
a processor coupled to the memory, the processor executing a UC&C control application in conjunction with instructions stored in the memory, wherein the UC&C control application is configured to:
detect a request for the communication session;
determine potential media paths between a source endpoint and a destination endpoint for facilitating the communication session;
sort the potential media paths based on a prioritization of the potential media paths and NAT traversal connectivity, wherein the prioritization of the potential media paths is based on one or more of a Quality of Service (QoS) support, a port configuration, and a bandwidth availability;
select one of the prioritized potential media paths; and
enable facilitation of the requested communication session over the selected media path of the prioritized potential media paths.

13. The computing device of claim 12, wherein the UC&C control application is configured to:
for media paths not supporting QoS, discover misconfigured intermediate nodes using trace route; and
update a unified communication and collaboration (UC&C) monitoring service with media paths not supporting QoS except for known non-QoS scenarios.

14. The computing device of claim 12, wherein the UC&C control application is configured to:
employ a signaling exchange in a control plane to discover, to set up, and to secure two or more endpoints before the media is exchanged.

15. The computing device of claim 12, wherein the UC&C control application is configured to:
upon establishing an initial connection between the source endpoint and the destination endpoint, enable the media to bypass the UC&C control server and be routed directly between the source endpoint and the destination endpoint.

16. The computing device of claim 12, wherein the UC&C control application is configured to:
detect which ports of each network element (NE) along the potential media paths are configured for communication; and
determine if a configured port is optimal for audio/video communication.

17. The computing device of claim 12, wherein the UC&C control application is configured to:
store selected media path information for future use.

18. A method executed in a computing device for facilitating a communication session in a unified communication and collaboration (UC&C) aware network, the method comprising:
detecting a request for the communication session;
receiving packets for the communication session at a switch, wherein the switch forms expedited forwarding (EF) queues;
marking, by the switch, the packets for one of EF queues and Best Effort (BF) queues;
during a discovery of potential media paths between a source endpoint and a destination endpoint for facilitating the communication session, detecting whether each discovered potential media path supports Quality of Service (QoS) by examining the markings of each available media path;
sorting the potential media paths based on a prioritization of the potential media paths and NAT traversal connectivity, wherein the prioritization of the potential media paths is based on one or more of a Quality of Service (QoS) support, a port configuration, and a bandwidth availability;
if one or more potential media paths support QoS, prioritizing the potential media paths that support QoS;
if a potential media path does not support QoS, designating that media path as a last resort media path;
selecting one of the prioritized potential media paths; and
facilitating the requested communication session over the selected media path of the prioritized potential media paths.

19. The method of claim 18, further comprising:
prioritizing the potential media paths based on one or more of cost and one or more modalities of the requested communication session, wherein the communication session is at least one from a set of; an audio call, an application sharing session, a data sharing session, a whiteboard sharing session, a video conference, and a collaboration exchange.

20. The method of claim 18, further comprising:
using one of Real time Transport Protocol (RTP) and Secure RTP (SRTP) for audio and video media exchange; and
using Session Initiation Protocol (SIP) for signaling.

* * * * *